Sept. 2, 1952  L. H. GARDNER  2,608,995
SOLENOID ACTUATING REVERSING VALVE
Filed May 1, 1946  3 Sheets-Sheet 1
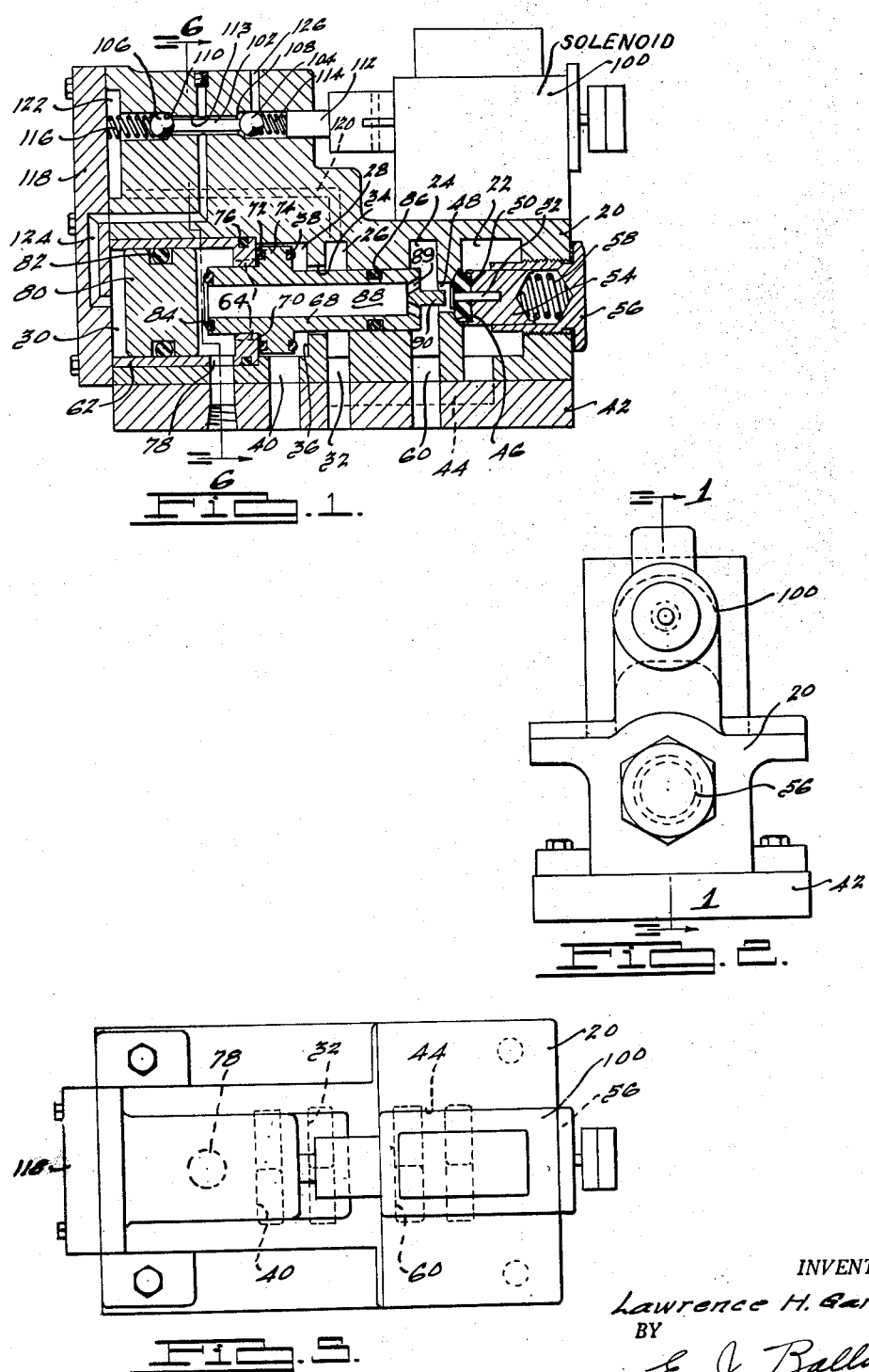
INVENTOR.
Lawrence H. Gardner.
BY
E. J. Balluff
ATTORNEY.

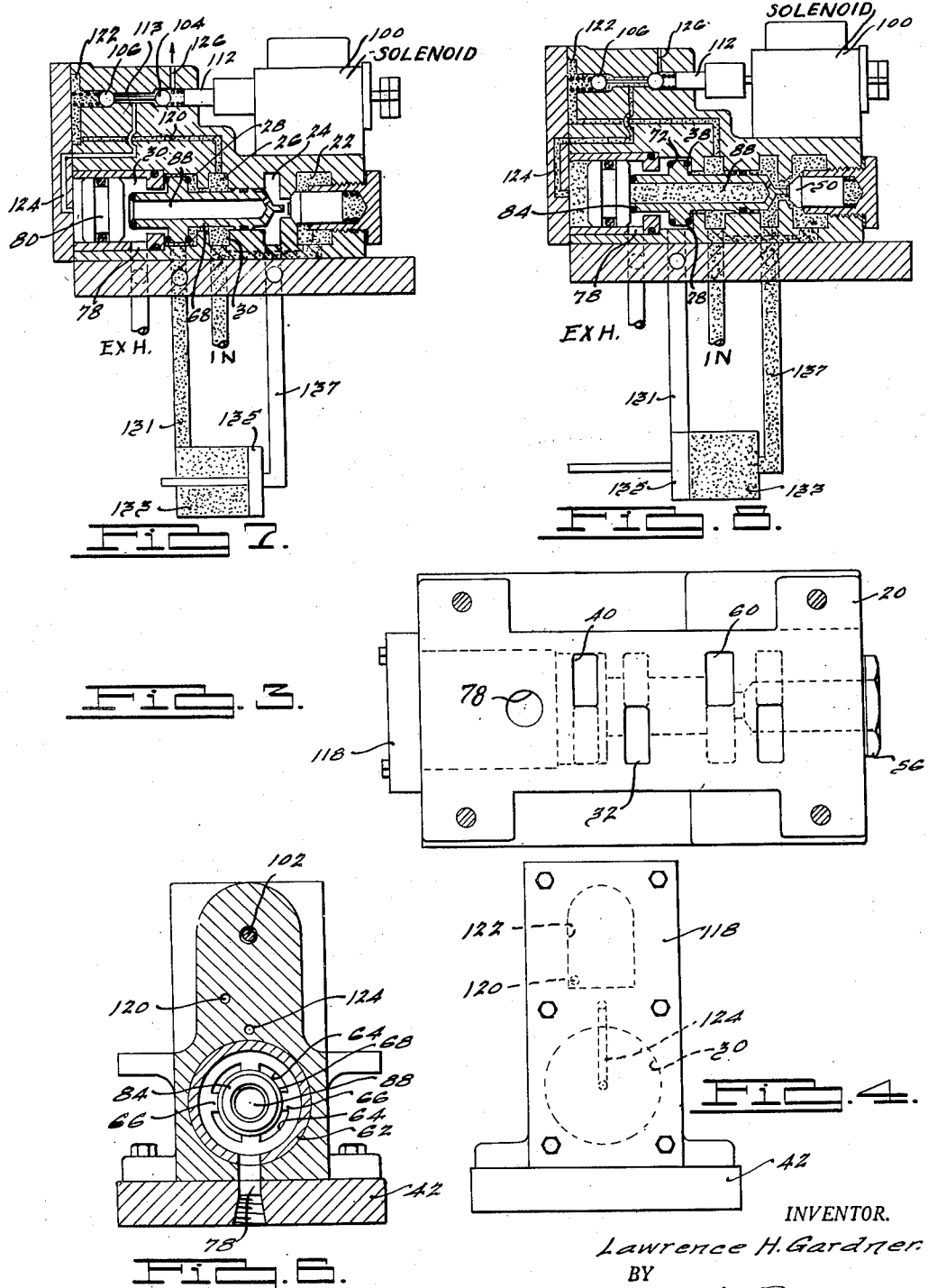

Sept. 2, 1952     L. H. GARDNER     2,608,995
SOLENOID ACTUATING REVERSING VALVE
Filed May 1, 1946     3 Sheets-Sheet 3

INVENTOR.
Lawrence H. Gardner.
BY
E. J. Balluff
ATTORNEY.

Patented Sept. 2, 1952

2,608,995

UNITED STATES PATENT OFFICE 2,608,995

SOLENOID ACTUATING REVERSING VALVE

Lawrence H. Gardner, Detroit, Mich., assignor to Automatic Valve, Inc., Farmington, Mich., a corporation of Michigan Application May 1, 1946, Serial No. 666,269

25 Claims. (Cl. 137—623)

This invention relates to valves and has particular reference to valves suited for continuous high speed operation for controlling fluid pressure. As used herein the term "fluid pressure" contemplates a liquid or gas under pressure.

Principal objects of the invention are to provide:

A new and improved valve of the character disclosed;

A new and improved high speed solenoid actuated air control valve;

A valve of the character disclosed which is more efficient in operation, which has a wider range of utility, and which is relatively simple in construction as compared with valves of this type heretofore known.

Other and further objects of the invention will be apparent from the following description and claims and will be understood by reference to the accompanying drawings, of which there are three sheets, which by way of illustration show preferred embodiments and the principles thereof and what I now consider to be the best mode in which I have contemplated applying those principles. Other embodiments of the invention embodying the same or equivalent principles may be used and structural changes may be made as desired by those skilled in the art without departing from the present invention and the purview of the appended claims. I also contemplate that of the several different features of my invention, certain ones thereof may be advantageously employed in some applications separate and apart from the remainder of the features.

In the drawings:

Fig. 1 is a vertical sectional view of a valve embodying the invention, taken generally on the line 1—1 of Fig. 2, but with certain parts broken away;

Fig. 2 is an elevational view of one end of the device;

Fig. 3 is a bottom plan view with the bottom plate removed;

Fig. 4 is an elevational view of the other end thereof;

Fig. 5 is a top plan view of the device;

Fig. 6 is a sectional view taken generally along the line 6—6 of Fig. 1;

Fig. 7 is a somewhat diagrammatic view similar to Fig. 1, showing the valve parts with the solenoid deenergized and a connected work cylinder with the ram thereof in;

Fig. 8 is a view similar to Fig. 7 but showing the arrangement of the parts with the solenoid energized and the ram out;

Figure 9:
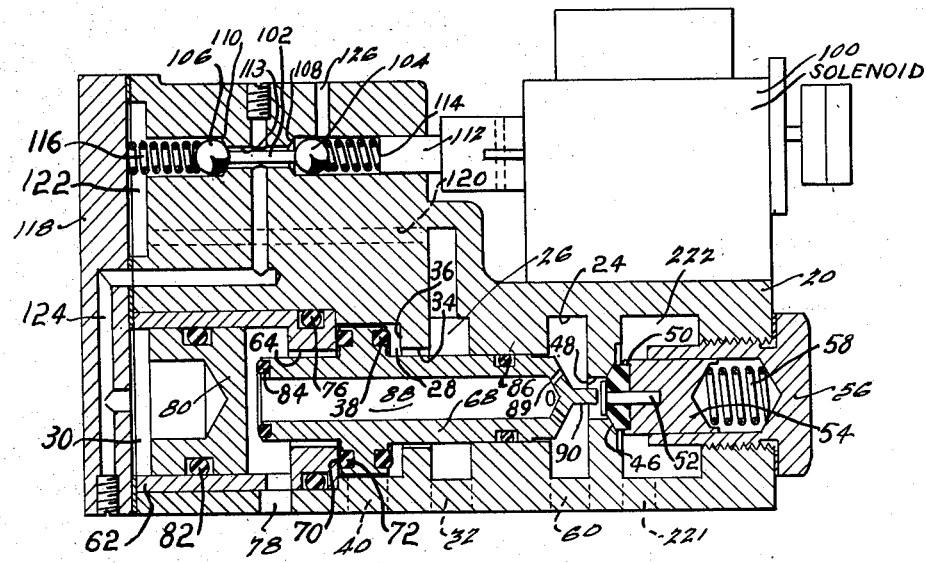
Fig. 9 is a sectional view of a valve embodying a modified form of the invention with the bottom plate thereof omitted.

Referring now to Figs. 1 to 8, a valve embodying the invention comprises a valve body or casing 20 provided with chambers 22, 24, 26, 28 and 30. The main supply chamber 26 is provided with a fluid inlet port 32 connected to a suitable source of high pressure fluid, such as air. A wall defining the chamber 26 is provided with a duct or pressure supply passage 34, and a valve comprising a seat 36 and a valve member 38 is provided for controlling the flow of fluid from the chamber 26 through the duct 34 and into the transfer chamber 28. The chamber 28 is provided with an outlet port 40 leading to a work cylinder on one side of the piston or ram thereof.

A plate 42 secured to the bottom of the valve body 20 is provided with a cross duct 44 which establishes communication between the fluid pressure inlet port 32 and the auxiliary supply chamber 22 so that the chamber 22, like the chamber 26, is supplied with fluid under pressure and at line pressure.

A wall defining the chamber 22 is provided with a valve seat 46 around a duct or pressure supply passage 48 leading to the transfer chamber 24. A normally closed valve member 50 is cooperable with the seat 46 for controlling the flow of fluid under pressure through the duct 48. The valve member 50 comprises a piece of resilient material, such as rubber, fixed by a pin 52 to member 54 which is freely, slidably arranged in the cup-shaped member 56, which in turn is threadedly secured in position in a threaded opening in the casing or cylinder block 20. A spring 58 arranged between the members 54 and 56 biases the valve member 50 to its seat. The sliding fit between the members 54 and 56 is such that there is no dash pot action. The chamber 24 is provided with a port 60 leading to the work cylinder on the other side of the piston thereof.

The exhaust chamber 30 and the transfer chamber 28 are in part defined by a cup-shaped member 62 which is seated and secured in a bore in the casing 20, the transverse wall of the members 62 separating the chamber 30 from the chamber 28 and being apertured as shown in Fig. 6 to define a duct or exhaust passage 64 between such chambers. The duct 64 is composed of four slots separated by arms 66 the inner surfaces of which are finished to form a sliding support for one end of the transfer valve member 68.

The face of the transverse portion of the cup-shaped member 62 exposed to the chamber 28 forms a valve seat 70 for cooperation with a valve member 72. The valve members 72 and 38 are annular rings of resilient material carried on opposite circular faces of an enlarged annular portion 74 of the valve member 68. A gasket 76 is arranged in an exterior groove in the cup-shaped member 62 so as to form a seal between the outer surfaces of the cup-shaped member 62 and the inner surface of the bore in which it is arranged.

The chamber 30 is provided with an exhaust port 78 forming an atmospheric vent. A piston valve member 80 is reciprocably arranged in the bore of the cup-shaped member 62, the periphery of the piston being provided with a groove in which an O-ring packing or sealing member 82 is arranged. This sealing member may be of the type disclosed in Christensen Patent No. 2,180,795, issued November 21, 1939, for "Packing." The piston 80 forms a valve member, and one face thereof is cooperable with a valve seat 84 in the form of an annular resilient ring arranged on one end of the valve member 68.

The transfer valve member 68 comprises a hollow tubular member which is reciprocably mounted in the body 20, one end thereof being supported by the inner surfaces of the arms 66 as previously described, while the other end thereof is slidably arranged in a bore extending between the chambers 24 and 26. An O-ring packing 86 is arranged in a peripheral groove in the valve member 68 for cooperation with the bore in which the valve member 68 is slidably mounted so as to establish a seal between the valve member 68 and the bore in the valve body 20 between the chambers 24 and 26.

The valve member 68 is hollow and forms a duct 88, one end of which opens into the exhaust chamber 30 on one side of the piston 80 thereof, while the other end of such duct opens into the chamber 24 through ports 89. The last-mentioned end of the valve member 68 is provided with an extension 90 which is adapted to project through the duct 48 and engage the head of the pin 52 securing the valve member 50 in position for unseating such valve member from its seat when the valve member 68 moves to the right from the position shown in Fig. 1.

A solenoid 100 and a pilot valve are provided for controlling the operation of the valves just described, the pilot valve comprising a slidable pin 102, ball valves 104 and 106, and valve seats 108 and 110. The body 20 is provided with a stepped bore 113 in line with the reciprocating member 112 of the solenoid 100. The pin 102 and the ball valves 104 and 106 are arranged in such stepped bore so that the valve 106 will be seated on the valve seat 110 or the valve 104 will be seated on the seat 108.

A spring 114 is confined between the ball valve 104 and the member 112 and biases the ball valve 104 toward its seat 108. Likewise, a spring 116 confined between the ball valve 106 and the end plate 118 biases the ball valve 106 toward its seat.

In the position shown in Figures 1 and 7, the solenoid is deenergized whereby the spring 116 is holding the ball valve 106 on its seat 110. A duct 120 affords communication between chamber 26 and a chamber 122 which communicates with the stepped bore behind the ball valve 106. The valve 106 while on its seat prevents the flow of fluid pressure from the chamber 122 past the ball valve 106. A duct 124 affords communication between the chamber 30 and the reduced portion of the stepped bore between the valve seats 110 and 108. An atmospheric vent 126 communicates with the portion of the bore in which the ball valve 104 is arranged so that with the valve arranged as illustrated in Figures 1 and 7, the chamber 30 will be vented to atmosphere through the duct 124, the stepped bore, and the atmospheric vent 126.

When the solenoid 100 is energized the member 112 will through the spring 114 seat the ball valve 104 on its seat 108, thereby closing the communication of the chamber 30 through the duct 124 to atmosphere, and at the same time unseating the valve 106 so as to permit the supply of fluid under pressure from the chamber 122 through the duct 124 to the chamber 30.

Reference may now be had to Figs. 7 and 8 wherein the two positions of the valve parts with reference to the work cylinder are illustrated. The parts as arranged in Fig. 7 correspond generally with the arrangement of the parts shown in Fig. 1. In Figs. 7 and 8 the high pressure air has been indicated by dots. The ducts and chambers in the valve and the work cylinder filled with low pressure air have been left blank.

From Fig. 7 it will be noted that high pressure fluid, such as air, is being supplied to the chambers 26 and 22, the duct 120, the chamber 122, the chamber 28, the conduit 131 leading to the work cylinder 133, and such work cylinder on one side of the ram or piston 135 thereof. The work cylinder 133 on the other side of the ram 135 thereof is being vented to atmosphere through conduit 137, chamber 24, duct 88, chamber 30, and atmospheric exhaust port 78.

The chamber 30 on the other side of the valve member 80 is also being vented to atmosphere through duct 124, bore 113 and vent 126.

Energization of the solenoid 100 will cause the member 112 thereof to seat the ball valve 104 on its seat and to unseat the ball valve 106 thereby supplying fluid under pressure from the chamber 122 through the duct 124 to the chamber 30 on one side of the piston 80 thereof, thereby causing the piston or valve member 80 to seat on the valve seat 84 on the end of the valve member 68, thus closing the duct 88 to atmosphere.

Continued movement of the valve member 80 in the same direction will shift the valve member 68 to the right thereby unseating the valves 72 and 50 and hence seating the valve member 38 on its seat. Unseating of the valve 72 will connect the chamber 28 and the conduit 131 on one side of the work cylinder 133 with atmosphere. Unseating of the valve member 50 will permit high pressure fluid in the chamber 22 to flow into chamber 24 and through conduit 137 to the work cylinder 133 for the purpose of moving the ram 135 thereof to the other end of the cylinder or to perform a work stroke. Seating of the valve member 38 will close off the supply of fluid under pressure to the conduit 131.

Deenergization of the solenoid will restore the parts to the position as shown in Fig. 7. Unseating of the ball valve 104 and seating of the ball valve 106 will serve to vent the chamber 30 to atmosphere through the duct 124 and the vent 126 whereby the air under pressure in the duct 88 will unseat the valve member 80 from its valve seat 84 and the valve member 38 from its valve seat, thereby closing the communication from the chamber 28 to atmosphere while establishing an atmospheric venting for the duct 88 and the conduit 137.

Figure 10:
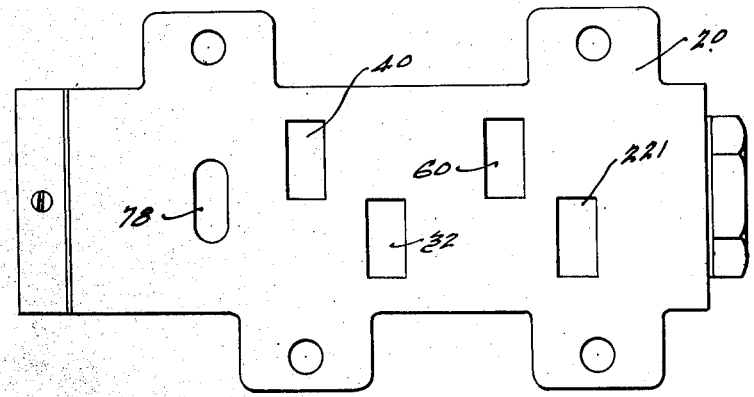
Fig. 10 is a bottom plan view of the device as shown in Fig. 9.

In the construction shown in Figs. 9 and 10 the construction is similar to the foregoing and the same reference numerals are applied thereto where applicable. In this case the chamber 222 corresponding to chamber 22 is supplied with low pressure air through the inlet port 221 thereof instead of being supplied with air at the same pressure as the chamber 26. For example, high pressure air of the order of 60 lbs. per sq. in. may be supplied to the chamber 26, whereas low pressure air of the order of 15 lbs. per sq. in. may be supplied to the chamber 222. In some applications it is desirable to use a lower pressure air to move the piston of the work cylinder in one direction than is employed to move such work piston in the opposite direction.

In Fig. 9 the bottom plate of the valve has been omitted, and Fig. 10 shows the ports in the bottom face of the valve body 20. In Figs. 9 and 10 the same reference characters have been employed as used in connection with the previous modification to designate corresponding parts.

The valves may be actuated by some means other than a solenoid, although where high speed operation is desired a solenoid forms a very effective way of obtaining high speed operation of the valve. The particular construction as illustrated, and including the relative size of the parts, the ducts and the air ports, makes such valve extremely efficient and dependable in operation.

While I have illustrated and described preferred embodiments of my invention, it is understood that these are capable of modification, and I therefore do not wish to be limited to the precise details set forth, but desire to avail myself of such changes and alterations as fall within the purview of the following claims.

I claim:

1. A fluid pressure control valve comprising a main supply chamber, an auxiliary supply chamber, ports for admitting fluid under pressure to said chambers, a first transfer chamber, a second transfer chamber, ports for connecting said transfer chambers respectively to opposite ends of a work cylinder, an exhaust chamber, an outlet port connecting said exhaust chamber to atmosphere, a first pressure supply passage connecting said main supply chamber to said first transfer chamber, an exhaust passage connecting said first transfer chamber to said exhaust chamber, a second pressure supply passage connecting said auxiliary supply chamber to said second transfer chamber, a normally closed valve controlling said second pressure supply passage, a tubular transfer valve open at its ends and connecting said second transfer chamber and said exhaust chamber, said transfer valve including valve portions arranged upon shifting of said transfer valve to alternately open and close said first pressure supply passage and to correspondingly close and open said exhaust passage, means on said transfer valve effective to open said normally closed valve when said transfer valve is in position to close said first pressure supply passage and to open said exhaust passage, and a valve member in said exhaust chamber effective to close the end of said transfer valve opening into said exhaust chamber when said transfer valve is in said last mentioned position.

2. A valve as defined in claim 1 in which the valve member in said exhaust chamber is a pressure actuated piston, a control port opening into the end of said exhaust cylinder at the opposite end of said piston from the open end of said transfer valve, and passages connecting said control port alternately to pressure and exhaust.

3. A valve as defined in claim 2 in which said last mentioned passages include a passage connecting said main supply chamber and said exhaust chamber and an exhaust passage, and valve means operable to close one or the other but not both of said passages.

4. A valve as defined in claim 1 in which said chambers are arranged in alignment with said main supply chamber immediately between said transfer chambers, said auxiliary supply chamber is beyond said second transfer chamber, and said exhaust chamber is beyond said first transfer chamber, and said tubular transfer valve interconnects said second transfer chamber and said exhaust chamber and extends through said main supply chamber and said first transfer chamber.

5. A valve as defined in claim 4 in which said first pressure supply passage and said exhaust passage are constituted by openings at opposite ends of said first transfer chamber in which said transfer valve is movable, and the valve portions of said transfer valve are constituted by opposite sides of a radially extending flange movable alternately into seating relation with opposite ends of said first transfer chamber surrounding the openings.

6. A valve as defined in claim 1 in which a passage is provided connecting said main and auxiliary supply chambers.

7. A valve as defined in claim 1 in which said main and auxiliary supply chambers are isolated from each other and supplied with fluid at different pressures.

8. A fluid pressure control valve comprising a casing having a first chamber adapted to be connected to a source of pressure fluid, a second chamber adapted to be connected to a work cylinder on one side of the piston thereof, a duct affording communication between said chambers, a third chamber having ports at opposite ends thereof, exhaust passages connected to said ports, and exhaust valve controlling outflow through one of said passages, a duct affording communication between said third and second chambers, each of said ducts terminating in a valve seat in said second chamber, a fourth chamber adapted to be connected to said work cylinder on the other side of the piston thereof, a fifth chamber arranged to be connected to a source of pressure fluid, a duct affording communication between said last two mentioned chambers and having a normally closed valve arranged to be opened for establishing communication between said chambers through said duct, valve members in said second chamber movably mounted to alternately seat on said valve seats therein for alternately closing said ducts communicating with said chamber, a piston valve member reciprocably mounted in said third chamber, said chambers and interconnecting ducts being arranged in alignment, a bore extending between said first and fourth chambers and in alignment with said ducts, a reciprocable hollow valve member open at its opposite ends and extending through said ducts and bore and between said third and fourth chambers and having a valve seat around the passage through the hollow valve member around the end thereof in said third chamber for seating said piston valve member in said third chamber, said valve members in said second chamber being fixed to and movable with said hollow valve member, one end of said hollow valve member being engageable with said normally closed valve which controls the communication between said fourth and fifth chambers for opening the same, and means including a passage between said first chamber and the end of said third chamber which contains the port connected to said one exhaust passage, and a pressure control valve in such passage for controlling the flow of fluid under pressure from said first to said third chamber whereby when said valve in such passage is open and said exhaust valve is closed fluid under pressure in said third chamber will be effective on the piston valve member therein to seat said piston valve member on the valve seat around the passage through said hollow valve member, and to shift said hollow valve member so as to unseat the valve member thereon controlling the communication through the duct between said second and third chambers in order to vent the side of said work cylinder which is connected to said second chamber; and so as to cause the valve member thereon to seat on the valve seat controlling the communication through the duct between said first and second chambers in order to shut off the supply of pressure fluid to the last mentioned side of said work cylinder; and so as to unseat the normally closed valve member from its valve seat in order to supply pressure fluid from said fifth chamber through said fourth chamber to the other side of said work cylinder.

9. A fluid pressure control valve according to claim 8 wherein a part of said passage between said first and third chambers forms a part of said one exhaust passage connected to said third chamber, and said exhaust valve is arranged to control fluid flow in such a manner that when the pressure control valve controlling said passage between said first and third chambers is open, said exhaust valve controlling exhaust flow from said third chamber through said last mentioned passage is closed and vice versa.

10. A fluid pressure control valve according to claim 8 wherein the other end of said hollow valve member communicates with said fourth chamber so as to vent the other side of said work cylinder to atmosphere when said piston valve member is unseated from the valve seat on the end of said hollow valve member in said third chamber.

11. A fluid pressure control valve according to claim 8 wherein a solenoid is arranged to repeatedly unseat said pressure control valve in said passage controlling the flow of fluid under pressure from said first to said third chamber.

12. A fluid pressure control valve according to claim 8 wherein a part of said passage between said first and third chambers forms a part of said one exhaust passage connected to said third chamber, said exhaust valve is arranged to control fluid flow in such a manner that when the pressure control valve controlling said passage between said first and third chambers is open, said exhaust valve controlling exhaust flow from said third chamber through said last mentioned exhaust passage is closed and vice versa, and means are provided for alternately unseating said pressure control valve in the passage between said first and third chambers and said exhaust valve controlling exhaust flow from said third chamber through said last mentioned exhaust passage.

13. A fluid pressure control valve according to claim 8 wherein a duct interconnects said first and fifth chambers.

14. A fluid pressure control valve according to claim 8 wherein said fifth chamber is provided with fluid under a lower pressure than that supplied to said first chamber.

15. A fluid pressure control valve according to claim 8 wherein the area of the port controlled by the valve seat around the passage through the hollow valve member is materially less than the area of the piston valve member on the side thereof remote from such valve seat.

16. A fluid pressure control valve comprising a casing having a first chamber connected to a fluid supply port and forming a fluid pressure chamber, a second chamber adapted to be connected to a work cylinder on one side of the piston thereof, a duct affording communication between said chambers, a third chamber having ports at opposite ends thereof, exhaust passages connected to said ports, an exhaust valve controlling outflow through one of said passages, a duct affording communication between said second chamber and the end of said third chamber at which said other exhaust port is located, a valve seat in said second chamber associated with each of said ducts, a fourth chamber adapted to be connected to said work cylinder on the other side of the piston thereof, a fifth chamber arranged to be connected to a source of pressure fluid, a duct affording communication between said last two mentioned chambers and having a valve arranged to be unseated for establishing communication between said chambers through said duct, valve members in said second chamber movably mounted to alternately seat on said valve seats therein for alternately closing said ducts communicating with said second chamber, a piston valve member reciprocably mounted in said third chamber, a bore extending between said first and fourth chambers, a reciprocable hollow valve member open at its opposite ends and extending through said ducts and bore and between said third and fourth chambers and having a valve seat around the passage through the hollow valve member around the end thereof in said third chamber for seating said piston valve member in said third chamber, said valve members in said second chamber being fixed to and movable with said hollow valve member, one end of said hollow valve member being engageable with said valve which controls the communication between said fourth and fifth chambers for opening the same, and means for supplying fluid under pressure to said third chamber on the side of said piston valve member thereof remote from the valve seat on said hollow valve member whereby fluid under pressure in said third chamber will be effective on the piston valve member therein to seat said piston valve member on the valve seat around the passage through said hollow valve member, and to shift said hollow valve member so as to unseat the valve member thereon controlling the communication through the duct between said second and third chambers in order to vent the side of said work cylinder which is connected to said second chamber; and so as to cause the valve member thereon to seat on the valve seat controlling the communication through the duct between said first and second chambers in order to shut off the supply of pressure fluid to the last mentioned side of said work cylinder; and so as to unseat the valve member from the valve seat controlling the flow through the duct between the fourth and fifth chambers in order to supply pressure fluid to the other side of said work cylinder.

17. A fluid pressure control valve according to claim 16 wherein said means for supply fluid under pressure to said third chamber has associated therewith means for intermittently venting such side of said third chamber to atmosphere.

18. A fluid pressure control valve according to claim 16 wherein the other end of said hollow valve member communicates with said fourth chamber so as to vent the other side of said work cylinder ot atmosphere when said piston valve member is unseated from the valve seat on the end of said hollow valve member in said third chamber.

19. A fluid pressure control valve according to claim 16 wherein a duct interconnects said first and fifth chambers.

20. A fluid pressure control valve according to claim 16 wherein said fifth chamber is provided with fluid under a lower pressure than that supplied to said first chamber.

21. A fluid pressure control valve according to claim 16 wherein the area of the port controlled by the valve seat around the passage through the hollow valve member is materially less than the area of the piston valve member on the side thereof remote from such valve seat.

22. A fluid pressure control valve comprising a casing having a first chamber adapted to be connected to a source of pressure fluid, a second chamber adapted to be connected to a work cylinder on one side of the piston thereof in order to supply pressure fluid to such cylinder to perform a work stroke, a duct affording communication between said chambers, a third chamber having ports at opposite ends thereof, exhaust passages connected to said ports, an exhaust valve controlling outflow through one of said passages, a duct affording communication between said third and second chambers, each of said ducts terminating in a valve seat in said second chamber, a fourth chamber adapted to be supplied with pressure fluid, a bore between said third and fourth chambers, valve members in said second chamber movably mounted to alternately seat on said valve seats therein for alternately closing said ducts communicating with said chamber, a piston valve member reciprocably mounted in said third chamber, a reciprocable hollow valve member open at its opposite ends and extending through said ducts and through said bore between said third and fourth chambers and having a valve seat around the passage through the hollow valve member around the end thereof in said third chamber, said valve members in said second chamber being fixed to and movable with said hollow valve member, and means including a passage between said first chamber and the end of said third chamber which contains the port connected to said one exhaust passage, and a pressure control valve in such passage for controlling the flow of fluid under pressure from said first to said third chamber whereby when said pressure control valve in such passage is open and said exhaust valve is closed, fluid under pressure in said third chamber will be effective on the piston valve member therein to seat said piston valve member on the valve seat around the passage through said hollow valve member, and to shift said hollow valve member so as to unseat the valve member thereon controlling the communication through the duct between said second and third chambers in order to vent the side of said work cylinder which is connected to said second chamber; and so as to cause the valve member thereon to seat on the valve seat controlling the communication through the duct between said first and second chambers in order to shut off the supply of pressure fluid to the last mentioned side of said work cylinder.

23. A fluid pressure control valve according to claim 22 wherein a part of said passage between said first and third chambers forms a part of said one exhaust passage connected to said third chamber, and said exhaust valve is arranged to control fluid flow in such a manner that when the pressure control valve controlling said passage between said first and third chambers is open, said exhaust valve controlling exhaust flow from said third chamber through said last mentioned exhaust passage is closed and vice versa.

24. A fluid pressure control valve according to claim 22 wherein a part of said passage between said first and third chambers forms a part of said one exhaust passage connected to said third chamber, said exhaust valve is arranged to control fluid flow in such a manner that when the pressure control valve controlling said passage between said first and third chambers is open, said exhaust valve controlling exhaust flow from said third chamber through said last mentioned exhaust passage is closed and vice versa, and means are provided for alternately unseating said pressure control valve and said exhaust valve.

25. A fluid pressure control valve according to claim 22 wherein the area of the port controlled by the valve seat around the passage through the hollow valve member is materially less than the area of the piston valve member on the side thereof remote from such valve seat.

LAWRENCE H. GARDNER.

REFERENCES CITED

The following references are of record in the file of this patent:

UNITED STATES PATENTS

| Number | Name | Date |
| --- | --- | --- |
| 624,890 | Batchelor | May 9, 1899 |
| 2,097,201 | Renkenberger | Oct. 26, 1937 |
| 2,157,240 | Keel | May 9, 1939 |
| 2,409,517 | Schmit | Oct. 15, 1946 |

FOREIGN PATENTS

| Number | Country | Date |
| --- | --- | --- |
| 586,501 | Great Britain | Mar. 20, 1947 |